(12) United States Patent
Landrieve

(10) Patent No.: US 12,215,740 B2
(45) Date of Patent: Feb. 4, 2025

(54) SYSTEM FOR DETERMINING AT LEAST ONE DEFECT OF A BEARING AND ASSOCIATED METHOD

(71) Applicant: Aktiebolaget SKF, Gothenburg (SE)

(72) Inventor: Franck Landrieve, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 148 days.

(21) Appl. No.: 17/959,885

(22) Filed: Oct. 4, 2022

(65) Prior Publication Data

US 2023/0113380 A1 Apr. 13, 2023

(30) Foreign Application Priority Data

Oct. 12, 2021 (DE) .......................... 102021211491.1

(51) Int. Cl.
- *F16C 19/52* (2006.01)
- *F16C 41/00* (2006.01)
- *G01M 13/04* (2019.01)
- *G01M 13/045* (2019.01)

(52) U.S. Cl.
CPC .............. *F16C 19/52* (2013.01); *F16C 41/00* (2013.01); *G01M 13/04* (2013.01); *G01M 13/045* (2013.01); *F16C 2233/00* (2013.01)

(58) Field of Classification Search
CPC ... G01M 13/045; G01M 13/04; G01M 99/008
See application file for complete search history.

(56) References Cited

U.S. PATENT DOCUMENTS

| | | | |
|---|---|---|---|
| 6,591,682 B1* | 7/2003 | Lysen | G01N 29/14 702/56 |
| 2007/0208841 A1* | 9/2007 | Barone | B61L 15/0027 709/223 |
| 2008/0033695 A1* | 2/2008 | Sahara | G01H 1/003 702/185 |
| 2009/0010386 A1* | 1/2009 | Peschmann | G01V 5/281 378/57 |
| 2013/0160568 A1* | 6/2013 | Voss | G01L 3/02 73/862.191 |
| 2020/0133257 A1* | 4/2020 | Cella | G05B 19/4183 |
| 2021/0148408 A1 | 5/2021 | Landrieve | |

* cited by examiner

*Primary Examiner* — Jermele M Hollington
*Assistant Examiner* — Temilade S Rhodes-Vivour
(74) *Attorney, Agent, or Firm* — GARCIA-ZAMOR INTELLECTUAL PROPERTY LAW, LLC; Ruy Garcia-Zamor

(57) ABSTRACT

A system for determining at least one defect of a bearing providing a first ring and a second ring capable of rotating concentrically relative to one another, first and second distance sensors mounted on the first ring of the bearing for measuring first and second differential distances between the first ring and the second ring, a storage device for storing each measured differential distance, a device configured to determine a first temporal profile of a radial relative displacement between the first and second rings, and a second temporal profile of an axial relative displacement between the first and second rings according to the stored measured differential distances in the storage device, and a device that identifies a defect of the bearing from the temporal profile.

20 Claims, 7 Drawing Sheets

SYSTEM FOR DETERMINING AT LEAST ONE DEFECT OF A BEARING AND ASSOCIATED METHOD

CROSS-REFERENCE TO RELATED APPLICATIONS

This application claims priority to German Patent Application no. 102021211491.1, filed Oct. 12, 2021, the contents of which is fully incorporated herein by reference.

TECHNICAL FIELD OF THE INVENTION

The present invention is directed to a method and system for determining at least one defect of a bearing. More particularly, the invention deals with determining at least one defect of a bearing using distance sensors of the bearing.

BACKGROUND OF THE INVENTION

Rolling bearings may be provided with clearance measurement means to measure a relative distance between the inner and outer rings and with vibration measurement means.

The clearance measurement means and the vibration measurement means monitor the rolling bearing to detect defects of the bearing and to predict bearing's residual life.

The clearance measurement means may comprise for example eddy current probes, and the vibration measurement means may comprise for example accelerometers.

The monitoring of the bearing requires two kinds of sensors. The implementation of each sensor requires specific bearing machining operations to mount the sensor on the bearing.

Accelerometers are absolute vibration sensors measuring global bearing vibrations generated by the bearing and the associated machine.

Bearings rotate generally at law rotating speeds, for example twelve turns per minute.

Moreover, monitoring vibrations with accelerometers needs also several calibration operations.

Calibration operations are running during specific calibration cycles of the machine to gather vibration measurements to get signals delivered by the accelerometers which are easily interpreted by the vibration monitoring conditioning means.

Further, as accelerometers are particularly adapted to measure vibrations of bearings rotating at high speeds, the measurements delivered by accelerometers implemented in law speed bearings are not accurate enough to obtain reliable vibration values.

Consequently, the present invention intends to overcome these disadvantages by providing a method to determine defects of bearings without using accelerometers.

SUMMARY OF THE INVENTION

According to an aspect, a method for determining at least one defect of a bearing comprising a first ring and a second ring capable of rotating concentrically relative to one another is proposed.

The method comprises:
measuring first and second differential distances between the first ring and the second ring when the first ring is rotating relative to the second ring at different relative angular positions of the first and second rings during a predefined duration,
storing each measured differential distance according to the relative angular position of the first and second rings and a value of a variable indicative of the evolution of the predefined duration,
determining a first temporal profile of a radial relative displacement between the first and second rings and a second temporal profile of an axial relative displacement between the first and second rings according to the stored measured differential distances, and
identifying a defect of the bearing from the temporal profiles.

The method permits to limit the number of sensor and sensor processing devices.

As no specific additional sensors are implemented to monitor the bearing, machining operations to lodge bearing monitoring sensors are reduced.

Further the implementation of the method does not need extensive calibrations.

Advantageously, the method comprises determining a third temporal profile of a reference displacement between the first ring and second ring from the radial relative displacement and the axial relative displacement, the temporal variable and the relative angular position of the first and second rings.

Preferably, the method comprises determining the relative rotational speed between the first and the second rings according to at least one of the temporal profiles.

Advantageously, in which identifying a defect comprises:
converting at least one of the temporal profiles to a representative in the frequency domain,
comparing the frequencies of the representative to predefined frequencies characterising defects of the bearing, and
identifying a defect of the bearing according to the result of the comparison.

Preferably, identifying a defect comprises:
calculating the second derivative of at least one of the temporal profiles to obtain the relative vibrations between the first and the second rings,
performing a vibration analysis from the relative vibrations, and
identifying a bearing defect from the vibration analysis.

According to another aspect, a system for determining at least one defect of a bearing comprising a first ring and a second ring capable of rotating concentrically relative to one another is proposed.

The system comprises:
measuring means for measuring first and second differential distances between the first ring and the second ring when the first ring is rotating relative to the second ring and for measuring the relative angular position of the first and second rings, during a predefined duration,
storing means for storing each measured differential distance according to the relative angular position of the first and second rings and a value of a temporal variable indicative of the evolution, of the predefined duration,
determining means for determining a temporal profile of a radial relative displacement between die first, and second rings and a second temporal profile of an axial relative displacement between the first and second rings according to the stored measured differential distances by the storing means, and
identifying means for identifying a defect of the bearing from the temporal profile.

Advantageously, the measuring means comprise first and second distance sensors mounted on the first ring of the bearing.

Advantageously, at least a first tapered groove and at least a second tapered groove are formed on the second ring of the bearing and are oriented towards the first ring, the first distance sensor being mounted on the first ring and facing a tapered wall of the first tapered groove of the second ring which is inclined with respect to an axis of the bearing, a longitudinal axis of the first distance sensor being perpendicular to the tapered wall of the first tapered groove, and the second distance sensor being mounted on the first ring and facing a tapered wall of the second tapered groove of the second ring which is inclined with respect to the axis of the bearing, a longitudinal axis of the second distance sensor being perpendicular to the tapered wall of the second tapered groove, the tapered walls of the first and second grooves extending obliquely along two opposite directions.

Preferably, at least one tapered groove is formed on the outer cylindrical surface of the second ring and oriented towards the first ring, the first distance sensor being mounted on the first ring and facing a tapered wall of the tapered groove of the second ring which is inclined with respect to an axis of the bearing, a longitudinal axis of the first distance sensor being perpendicular to the axis, and the second distance sensor being mounted on the first ring and distinct from the first distance sensor, the second distance sensor radially facing a second axial cylindrical surface of the second ring.

According to another aspect, the invention also relates to a bearing comprising a first ring, a second ring capable of rotating concentrically relative to one another, and a system as defined previously.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear on examination of the detailed description of embodiments, in no way restrictive, and the appended drawings in which.

DETAILED DESCRIPTION OF THE INVENTION

Figure 1:
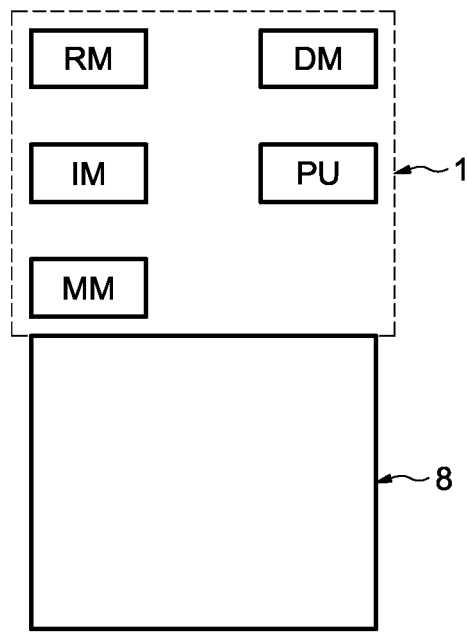
FIG. 1 illustrates schematically a system for determining defects of a bearing according to the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees, Reference is made to FIG. 1 which represents a bearing 8 comprising a first ring and a second ring capable of rotating concentrically relative to one another (not represented), and a system 1 for determining at least one defect of a bearing 8. The bearing 8 having the first and second rings 10, 12 is shown on FIG. 2.

The system 1 comprises measuring means MM for measuring first and second differential distances between the first ring 10 and the second ring 12 when the first ring 10 is rotating relative to the second ring 12 and for measuring the relative angular positions of the first and second rings, during a predefined duration.

The system 1 further comprises storing means RM for storing each differential measured distance by the measuring means MM according to the relative angular position of the first and second rings 10, 12 and a value of a temporal variable indicative of the evolution of the predefined duration.

Figure 2:
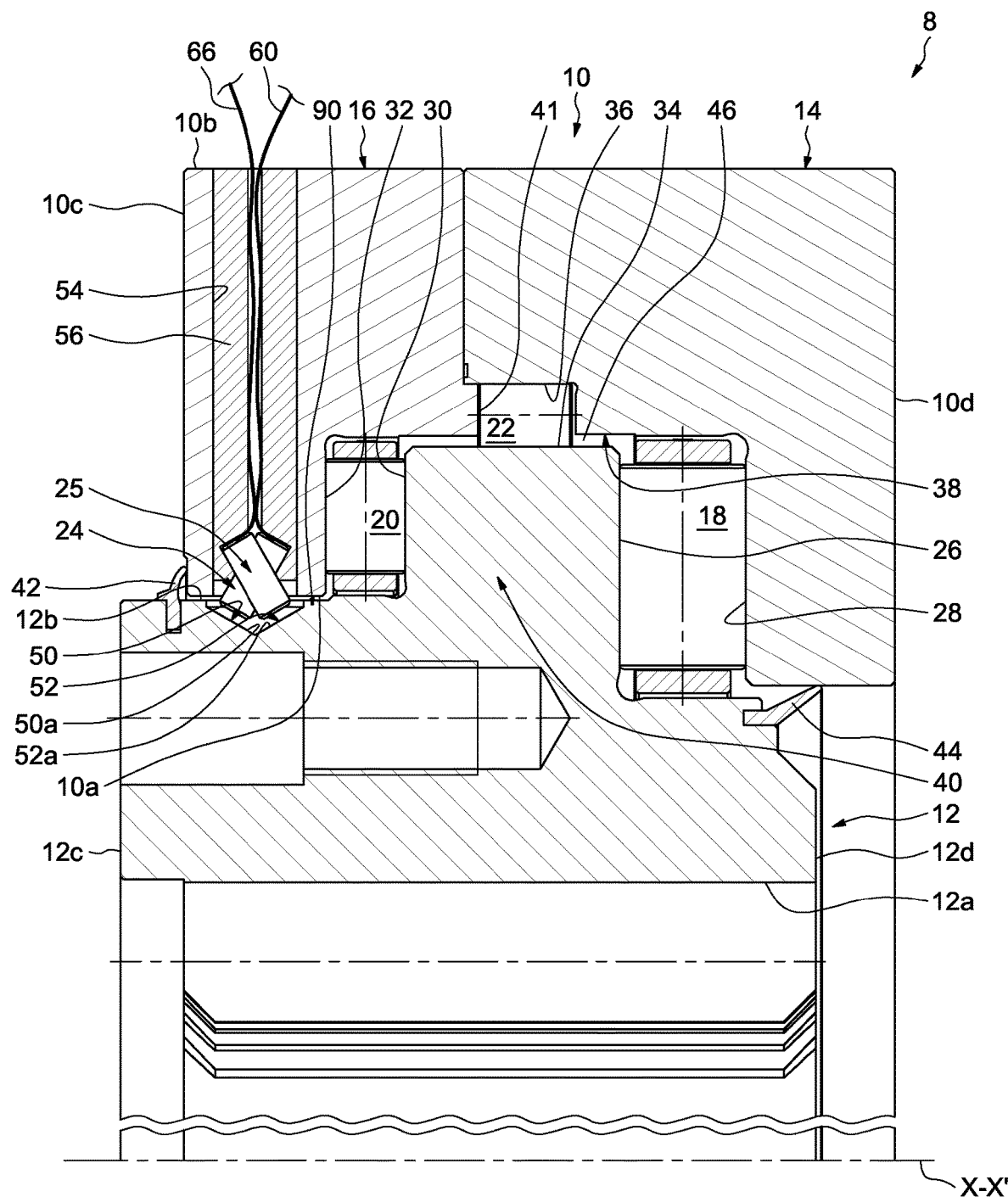
FIG. 2 is a partial cross-section of an example of a rolling bearing according to the invention.

The measuring means MM comprise for example first and second distance sensors 24, 25 (FIG. 2).

The system 1 further comprises determining means DM for determining a first temporal profile of a radial relative displacement Dr between the first 10 and second 12 rings, and a second temporal profile of an axial relative displacement Da between the first 10 and second 12 rings according to the stored measured differential distances in the storing means RM.

The system 1 comprises identifying means IM for identifying a defect of the bearing 8 from at least one of the first and second temporal profiles.

The system 1 further comprises a processing unit PU implementing the measuring means MM, storing means RM, determining means DM and identifying means IM.

The temporal variable is for example cadenced by the clock of the processing unit PU.

FIG. 2 illustrates a section of an example of the bearing 8.

The bearing 8 is a large-diameter rolling bearing comprising a first ring 10 and a second ring 12. In the illustrated example, the first ring 10 is the outer ring whereas the second ring 12 is the inner ring. The rolling bearing may for example be used in a tunnel boring machine, a wind turbine or any other applications using a large diameter rolling bearing.

The outer and inner rings 10, 12 are concentric and extend axially along the bearing rotation axis X-X' which runs in an axial direction. The rings 10, 12 are of the solid type.

The outer ring 10 is formed as a split ring and comprises a first ring 14 and a second ring 16 stacked one relative to the other in the axial direction. Each of the first and second rings 14, 16 of the outer ring is provided with a plurality of aligned through-holes (not shown) in order to be joined by fitting bolts.

In the illustrated example, the rolling bearing comprises two rows of axial rollers 18, 20 which are arranged between the outer and inner rings 10, 12 in order to form an axial thrust, and a row of radial rollers 22 which are arranged between the rings to form a radial thrust.

As will be described later, the rolling bearing also comprises the first and second distance sensors 24, 25 for detecting axial and radial relative displacements between the outer and inner rings 10, 12. In the illustrated example, the sensors 24, 25 are mounted on the outer ring 10.

The rollers 18, 20, 22 of one row are identical to one another. Each roller 18, 20, 22 comprises a cylindrical outer rolling surface and two opposite frontal end surfaces delimiting the outer rolling surface. The axis of rotation of each roller 22 is parallel to the axis X-X' of the bearing and perpendicular to the axes of each or the rollers 18, 20. In the illustrated example, the axial length of the rollers 18 is larger than the one of the rollers 20. Alternatively, the axial length of the rollers 18 may be smaller than, or may be equal to, the one of the rollers 20.

The rollers 18 are arranged axially between annular radial raceways 26, 28 respectively formed on the inner and outer rings 12, 10, Each radial raceway 26, 28 has in cross section a straight internal profile in contact with the rolling surfaces of the rollers 18. The raceways 26, 28 face each other in the axial direction.

The rollers 20 are arranged axially between annular radial raceways 30, 32 respectively formed on the inner and outer rings 12, 10. Each radial raceway 30, 32 has in cross section a straight internal profile in contact with the rolling surfaces of the rollers 20. The raceways 30, 32 axially face each other. The rows of rollers 18, 20 are spaced apart from each other in the axial direction.

The rollers 22 are arranged radially between annular axial raceways 34, 36 respectively formed on the inner and outer rings 12, 10, Each axial raceway 34, 36 has in cross section a straight internal profile in contact with the rolling surfaces of the rollers 22. The raceways 34, 36 face each other in the radial direction. The row of rollers 22 is radially offset outwards with respect to the rows of rollers 18, 20. The row of rollers 22 is axially located between the rows of rollers 18, 20.

The outer ring 10 comprises an annular groove 38 opening in a radial direction inwardly towards the inner ring 12. The outer ring 10 comprises an inner stepped cylindrical surface or bore 10a from which the groove 38 is formed. The outer ring 10 also comprises an outer cylindrical surface 10b which is radially opposite to the bore 10b. The outer ring 10 further comprises two opposite radial frontal surfaces 10c, 10d which axially delimit the bore 10a and the outer surface 10b of the ring.

The inner ring 12 comprises an annular protruding nose 40 engaging into the annular groove 38 of the outer ring. The nose 40 extends radially outwards.

The inner ring 12 comprises an inner cylindrical bore 12a and a stepped outer cylindrical surface 1211 which is radially opposite, to the bore 12a. In the illustrated example, the bore 12a of the inner ring is provided with a gear teeth (not referenced). The inner ring 12 further comprises two opposite radial frontal surfaces 12c, 12d which axially delimit the bore 12a and the outer cylindrical surface 12b. The protruding nose 40 protrudes radially from the outer cylindrical surface 12b.

The rows of rollers 18, 20 are arranged axially between the nose 40 of the inner ring and the groove 38 of the outer ring. The rows of rollers 18, 20 are disposed on each side of the nose 40 of the inner ring. The radial raceway 26 is located on the nose 40 and on a radial portion of the outer stepped cylindrical surface 12b of the inner ring. Alternatively, the radial raceway 26 may be completely located on the nose 40. The radial raceway 30 is located on the nose 40. The radial raceways 28, 32 are located on the groove 38 of the outer ring.

More precisely, a first radial flank of the nose 40 partly delimits the radial raceway 26 for the rollers 18. A first radial flank of the groove 38, which axially faces the first radial flank of the nose 40, delimits the radial raceway 28 for the rollers 18. A second flank of the nose 40 and a facing second flank of the groove 38 respectively delimits the radial raceways 30, 32 for the rollers 20. The opposite first and second flanks of the nose 40 delimit, axially the nose. Similarly, the opposite first and second flanks of the groove 38 delimit axially the groove. Each of the first and second flanks of the nose 40 extends radially the outer cylindrical surface 12b of the inner ring.

The row of rollers 22 is arranged radially between the nose 40 of the inner ring and the groove 38 of the outer ring. The axial raceways 34, 36 are respectively located on the nose 40 and the groove 38. An outer cylindrical surface of the nose 40 delimits the axial raceway 34. The outer cylindrical surface, of the no 40 and the outer cylindrical surface 12b are radially offset. As a result, the axial raceway 34 and the outer cylindrical surface 12b are also radially offset. The outer cylindrical surface of the nose 40 extends axially between the opposite radial flanks of the nose.

An axial bottom of the groove 38 delimits the axial raceway 36. In the illustrated example, an annular slot 41 is formed in the bottom of the groove 38 and delimits the axial raceway 36. The axial raceway 36 radially faces the outer cylindrical surface of the nose 40 onto which is formed the axial raceway 34.

In the illustrated example, the inner ring 12 is made in one part. Alternatively, the inner ring 12 may be divided in the axial direction in at least two separate parts secured together. In another variant, the nose 40 may be made separately from the main part of the inner ring.

As previously mentioned, the outer ring 10 is divided in the axial direction in two separate parts, the first ring 14 and the second ring 16. The first and second rings 14, 16 delimit together the groove 38. The radial raceway 28 is located on the first ring 14 and the radial raceway 32 is located on the second ring 16 of the outer ring.

The rolling bearing further comprises on each side an annular seal 42, 44 mounted on the inner ring 12 and provided to close the radial space that exists between the rings 10, 12. This radial space is defined between the bore 10a of the outer ring, and the outer cylindrical surface 12b and the outer surface of the nose 40 of the inner ring.

A closed space 46 is defined between the inner and outer ring 12, 14 and the seals 42, 44 in which the rows of rolling elements 18, 20 and 22, and the first and second distance sensors 24, 25 are housed.

Each seal 42, 44 is mounted into a groove (not referenced) formed on the outer cylindrical surface 12b of the inner ring and comes into contact with the outer ring 10. The seal 42 comes into contact with the radial frontal surface 10c of the outer ring. The seal 44 comes into contact with the bore 10a of the outer ring axially near the row of rollers 18. Alternatively, it could be possible to provide a reversed arrangement for at least one of the seals 42, 44 with the seal mounted on the outer ring 10 and coming into friction contact with the inner ring 12.

As previously mentioned, the first and second distance sensors 24, 25 are provided to detect axial and radial relative displacements between the outer and inner rings 10, 12. To this end, first and second annular tapered grooves 50, 52 are also formed on the inner ring 12. In the illustrated example, the grooves 50, 52 are formed on the outer cylindrical surface 12b of the inner ring.

Figure 3:
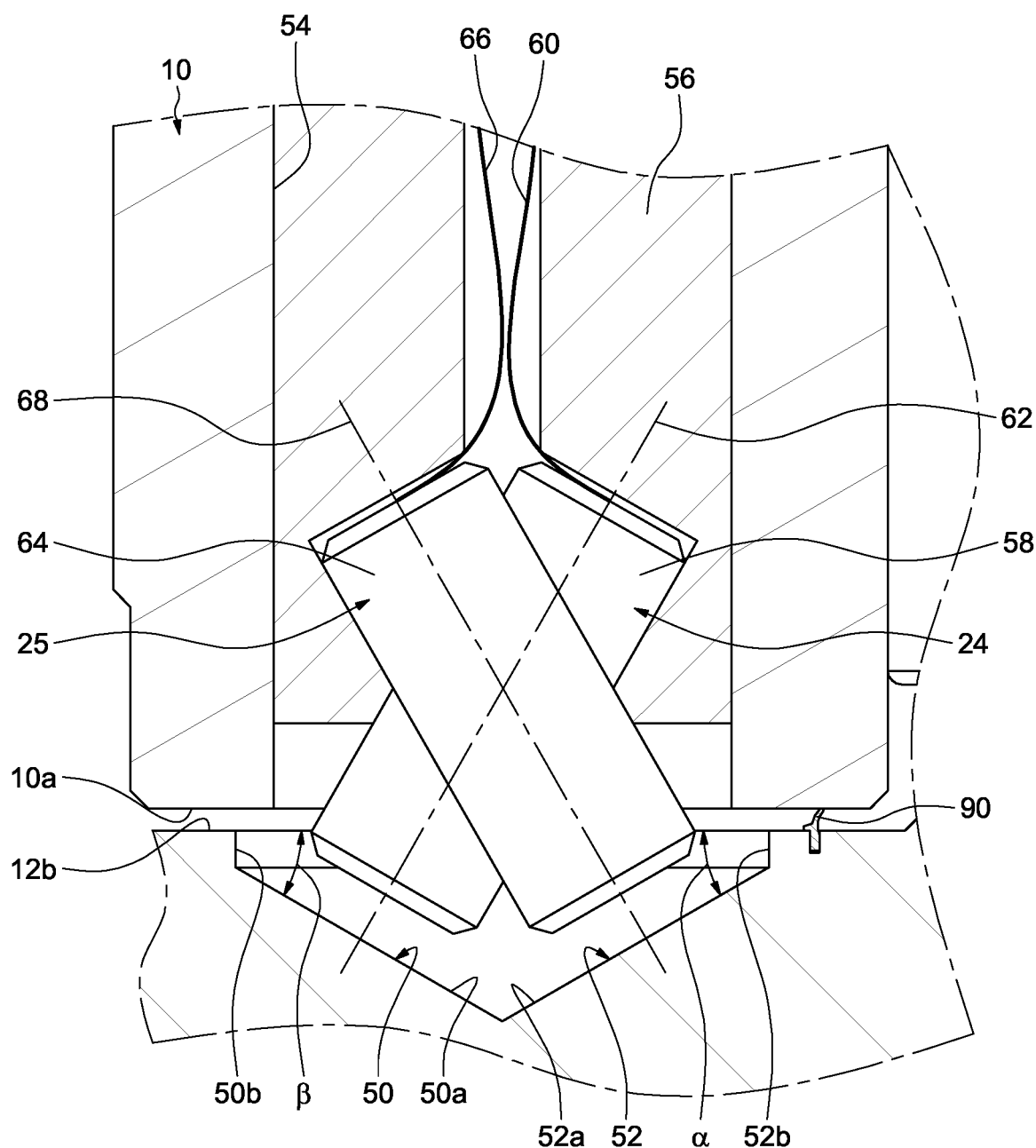
FIG. 3 is a detail view of FIG. 2.

As shown more clearly on FIG. 3, the first groove 50 extends radially inwards from the outer cylindrical surface 12b of the inner ring. The groove 50 comprises an annular tapered portion or wall 50a extending obliquely inwards. The tapered wall 50a has a frustoconical shape. The tapered wall 50a is inclined with respect to the axis X-X' (FIG. 2) of the rolling bearing. In other words, the tapered wall 50a is formed oblique to the axis X-X'. The tapered wall 50a is inclined with respect to the axial cylindrical surface 12b of the inner ring. In a radial plane of the rolling bearing as shown on FIG. 2, a first taper angle β is formed between the tapered wall 50a of the groove and the axial cylindrical surface 12b. For example, the value of the first taper angle β may be preferably comprised between 15° and 30°.

In the illustrated example, the groove 50 is provided with an annular radial side wall 50b extending radially inwards the outer cylindrical surface 12b and from which extends the tapered wall 50a. Alternatively, the groove 50 may be deprived of such side wall 50b. In this case, the tapered wall 50a extends directly from the axial cylindrical surface 12b of the inner ring.

The second groove 52 extends radially inwards from the outer cylindrical surface 12b of the inner ring. In the illustrated example, the second groove 52 extends axially from the first groove 50.

The groove 52 comprises an annular tapered portion or wall 52a extending obliquely inwards. The tapered wall 52a has a frustoconical shape. The tapered wall 52a is inclined with respect to the axis X-X' (FIG. 2) of the rolling bearing. The tapered wall 52a is inclined with respect to the axial cylindrical surface 12b of the inner ring. A second taper angle α is formed between the tapered wall 52a and the axial cylindrical surface 12b. In the illustrated example, the value of this second taper angle α is equal to the value of the first taper angle β formed between the tapered wall 50a of the first groove and the axial cylindrical surface 12b.

In the illustrated example, the second groove 52 is provided with an annular radial side wall 52b extending radially inwards the outer cylindrical surface 12b and from which extends the tapered wall 52a. Alternatively, the groove 52 may be deprived of such side wall 52b. In this case, the tapered wall 52a extends directly from the axial cylindrical surface 12b of the inner ring.

As previously mentioned, in the illustrated example, the second groove 52 extends axially from the first groove 50. Here, the tapered wall 52a of the second groove extends the tapered wall 50a of the second groove. Alternatively, a cylindrical bottom could interconnect the tapered walls 50a, 52a.

From the outer cylindrical surface 12b of the inner ring, the tapered wall 50a of the groove 50 extends obliquely inwards along a first direction and the tapered wall 52a of the groove 52 extends obliquely inwards along a second direction which is opposite to the first direction.

In the illustrated example, from the outer cylindrical surface 12b of the inner ring, the tapered wall 50a extends obliquely towards the frontal surface 12d (FIG. 2) of the inner ring while the tapered wall 52a extends obliquely towards the frontal surface 12c.

In the illustrated example, the tapered wall 52a of the groove 52 is symmetric to the tapered wall 50a of the groove 50 with respect to a radial plane passing through the edge between the walls. More generally, the groove 52 is symmetric to the groove 52 with respect to the radial plane.

The first distance sensor 24 faces the first groove 50. The sensor 24 faces the tapered wall 50a of the groove. The sensor 24 measures distances to the tapered wall 50a. The first distance sensor 25 faces the second groove 52. The sensor 25 faces the tapered wall 52a of the groove. The sensor 25 measures distances to the tapered wall 52a.

Referring once again to FIG. 2, the outer ring 14 is provided with a radial through-hole 54 inside which the first and second distance sensors 24, 25 are located. The through-hole 54 extends from the outer surface 10b of the outer ring and opens on the bore 10a. The through-hole 54 radially faces the first and second grooves 50, 52 of the inner ring.

In the illustrated example, each of the sensor 24, 25 is mounted into the through-hole 54 and protrudes radially into the radial space provided between the outer and inner rings 10, 12. The sensor 24 also protrudes into the first groove 50. The sensor 24 remains spaced apart from the tapered wall 50a of the groove. Similarly, the sensor 25 also protrudes into the second groove 52. The sensor 25 remains spaced apart from the tapered wall 52a of the groove. Alternatively, the sensors 24, 25 may be entirely located inside the through-hole 54.

The outer ring 10 further comprises a casing 56 which closes and seals the through-hole 54. The casing 56 also supports the sensors 24, 25. The sensors 24, 25 are secured to the casing 56 by any appropriate means. The casing 56 is located radially into the through-hole 54. The casing 56 is secured inside the through-hole 54 by any appropriate means, for example by force-fitting. The casing 56 is flush with the outer cylindrical surface 10b of the outer ring.

As shown more clearly on FIG. 3, the first sensor 24 comprises a sensor body 58 mounted inside the casing 56 of the outer ring. The sensor body 58 faces the tapered wall 50a of the first groove. The sensor body 58 protrudes into the groove 50. The sensor body 58 remains spaced apart from the tapered wall 50a.

In the disclosed example, the sensor 24 also comprises an output connecting cable 60 for transmitting sensing data which extends outwards relative to the sensor body 58. The output cable 60 extends radially outwards. The casing 56 is provided with a through-opening (not referenced) wherein the output cable 60 can go through. The output cable 60 connects the sensor 24 to the system 1 so as to transmit sensed measurements. Alternatively, the sensor 24 may be deprived of such output cable in case of a wireless sensor.

The sensor body 58 of the first sensor has a longitudinal axis 62 extending obliquely. The axis 62 also forms the longitudinal axis of the sensor 24. The axis 66 is perpendicular to the tapered wall 50a of the first groove.

The second sensor 25 comprises a sensor body 64 mounted inside the casing 56. The sensor body 64 faces the tapered wall 52a of the second groove. The sensor body 64 protrudes into the groove 52. The sensor body 64 remains spaced apart from the tapered wall 52a.

In the disclosed example, the sensor 25 also comprises an output connecting cable 66 for transmitting sensing data which extends outwards relative to the sensor body 64. The output cable 66 goes through the opening of the casing 56. The output cable 66 connects the sensor 25 to the storing means RM so as to transmit sensed measurements. Alternatively, the sensor 25 may be deprived of such output cable in case of a wireless sensor.

The sensor body 64 of the second sensor has a longitudinal axis 68 extending obliquely. The axis 68 also forms the longitudinal axis of the sensor 25. The axis 68 is perpendicular to the tapered wall 52a of the second groove.

Each of the sensor 24, 25 may be an inductive distance sensor, or an ultrasonic distance sensor, or an optical distance sensor. Alternatively, each of the sensor 24, 25 may be a mechanical distance sensor provided with a contact stylus. In this last case, the mechanical sensor faces the tapered wall 50a or 52a of the groove but also comes into contact with the tapered wall.

As previously mentioned, the sensor 24 measures distances to the tapered wall 50a of the first groove of the inner ring. The distances are measured along the longitudinal axis 62 of the sensor 24, The sensor 25 measures distances to the tapered wall 52a of the second groove of the inner ring. The distances are measured along the longitudinal axis 68 of the sensor 25.

Figure 4:
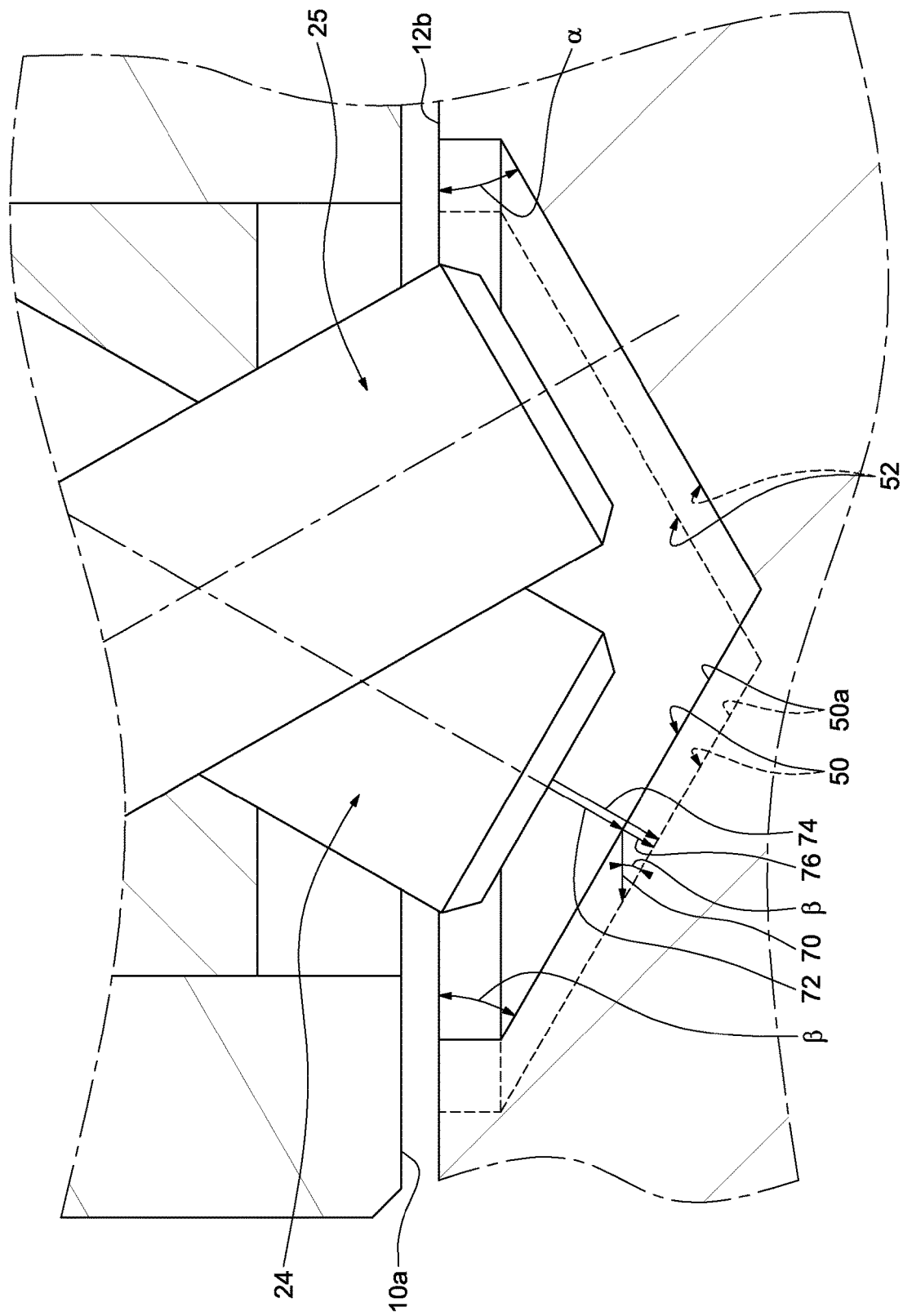
FIG. 4 is a detail view of FIG. 2 illustrating schematically an axial displacement of one ring of the bearing relative to another ring.

A pure axial displacement of the inner ring 12 relative to the outer ring 10 is shown schematically and partially on FIG. 4. The grooves 50, 52 represented in dotted lines illustrate the position of the inner ring 12 after the axial displacement. The axial displacement Da of the inner ring 12 relative to the outer ring 10 is illustrated by the arrow referenced 70.

The arrow referenced 72 illustrates a first distance to the tapered wall 50a of the groove measured by the sensor 24 before the axial displacement of the inner ring 12 relative to the outer ring 10. A second distance to the tapered wall 50a of the groove measured by the sensor 24 after this axial displacement is illustrated by the arrow referenced 74.

The displacement ΔM of the tapered wall 50a of the groove relative to the outer ring 10, which is detected by the sensor 24, is represented by the arrow referenced 76. The value of the relative displacement ΔM is equal to the differential measurement of the sensor 24, i.e. the difference between the second and the first distances measured by the sensor 24.

In case of pure axial displacement of the inner ring 12 relative to the outer ring 10 as shown on FIG. 4, the value of the displacement ΔM of the tapered wall 50a of the groove relative to the outer ring 10 is also equal to:

$$\Delta M = Da \times \sin \beta \quad (1)$$

where Da is the value of the axial displacement of the inner ring 12 relative to the outer ring 10, and β the value of the first tapered angle of the tapered wall 50a of the first groove.

Figure 5:
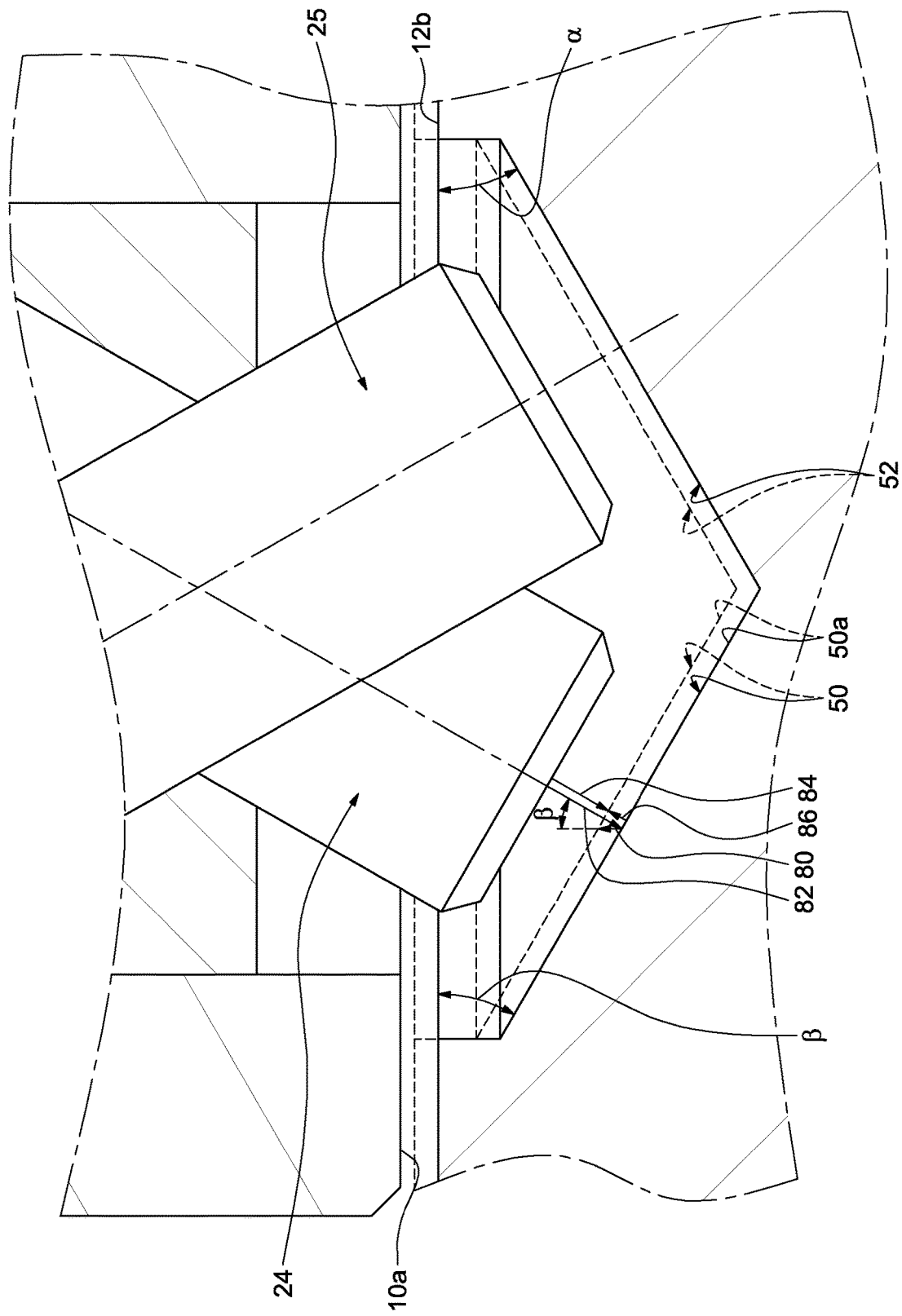
FIG. 5 is a detail view of FIG. 2 illustrating schematically a radial displacement of one ring of the bearing relative to another ring.

A pure radial displacement of the inner ring 12 relative to the outer ring 10 is shown schematically and partially on FIG. 5. The radial displacement Dr of the inner ring 12 relative to the outer ring 10 is illustrated by the arrow referenced 80.

The arrow referenced 82 illustrates a first distance to the tapered wall 50a of the groove measured by the sensor 24 before the radial displacement of the inner ring 12 relative to the outer ring 10. A second distance to the tapered wall 50a of the groove measured by the sensor 24 after this radial displacement is illustrated by the arrow referenced 84.

The displacement ΔM of the tapered wall 50a of the groove relative to the outer ring 10, which is detected by the sensor 24, is represented by the arrow referenced 86. The value of the relative displacement ΔM is equal to the differential measurement of the sensor 24.

In case of pure radial displacement of the inner ring 12 relative to the outer ring 10 as shown on FIG. 4, the value of the displacement ΔM of the tapered wall 50a of the groove relative to the outer ring 10 is also equal to:

$$\Delta M = Dr \times \cos \beta \quad (2)$$

where Dr is the value of the radial displacement of the inner ring 12 relative to the outer ring 10, and β the value of the first tapered angle of the wall 50a of the first groove.

In case of combined axial and radial displacements of the inner ring 12 relative to the outer ring 10 and considering that signals $S_{24}$ emitted by the first sensor 24 are a linear function of the distance measured by this sensor, the differential measurement $\Delta S_{24}$ of the sensor is thus defined by:

$$\Delta S_{24} = Dr \times \cos \beta + Da \times \sin \beta \quad (3)$$

Similarly, as concern the second sensor 25 facing the tapered wall 52a of the second groove, the differential measurement $\Delta S_{25}$ of this second sensor is defined by $$\Delta S_{25} = Dr \times \cos \alpha - Da \times \sin \alpha \quad (4)$$

where α is the value of the second tapered angle of the wall 50a of the groove.

As previously mentioned, in the illustrated example, the value of this second taper angle α is equal to the value of the first taper angle β formed between the tapered wall 50a of the first groove and the axial cylindrical surface 12b.

Accordingly, in this specific example, the differential measurement $\Delta S_{25}$ of the second sensor 25 is also defined by $$\Delta S_{25} = Dr \times \cos \beta - Da \times \sin \beta \quad (5)$$

Therefore, the axial relative displacement Da and the radial relative displacement Dr of the inner ring 12 relative to the outer ring 10 are equal to:

$$Da = \frac{(\Delta S_{24} - \Delta S_{25})}{2 \cdot \sin \beta} \quad (6)$$

$$Dr = \frac{(\Delta S_{24} + \Delta S_{25})}{2 \cdot \cos \beta} \quad (7)$$

Accordingly, the axial and radial relative displacements of the inner ring 12 relative to the outer ring 10 can be calculated from the displacements measured by the sensors 24, 25. Advantageously, the determining means DM calculates these axial displacements of the inner ring 12 relative to the outer ring 10.

Referring once again to FIGS. 2 and 3, in the illustrated example, the rolling bearing further comprises an additional seal 90 disposed inside the closed space 46 which is delimited by the seals 42, 44. The seal 90 is axially located near to the seal 42. The seal 90 is axially disposed between the seal 42 and the row of axial rollers 20. In the illustrated example, the seal 90 is mounted into a groove (not referenced) formed on the outer cylindrical surface 12b of the inner ring and comes into contact with the outer ring 10. The seal 90 comes into contact with the bore 10a of the outer ring near to die through-hole 54. Alternatively, the seal 90 may be mounted on the outer ring 14 and come into friction contact with the inner ring 12.

Radially between the outer and inner rings 10 and 12, the seal 90 delimits together with the seal 42 a closed detection space (not referenced) inside which open the first and second grooves 50, 52 of the inner ring and the through-hole 54 of the outer ring. Only the grooves 50, 52, the through-hole 54 and the sensors 24, 25 are located inside the detection space. There is no row of rollers inside the detection space. This reduces the risk that pollution, such as grease, dust, water, reaches the sensors 24, 25.

Figure 6:
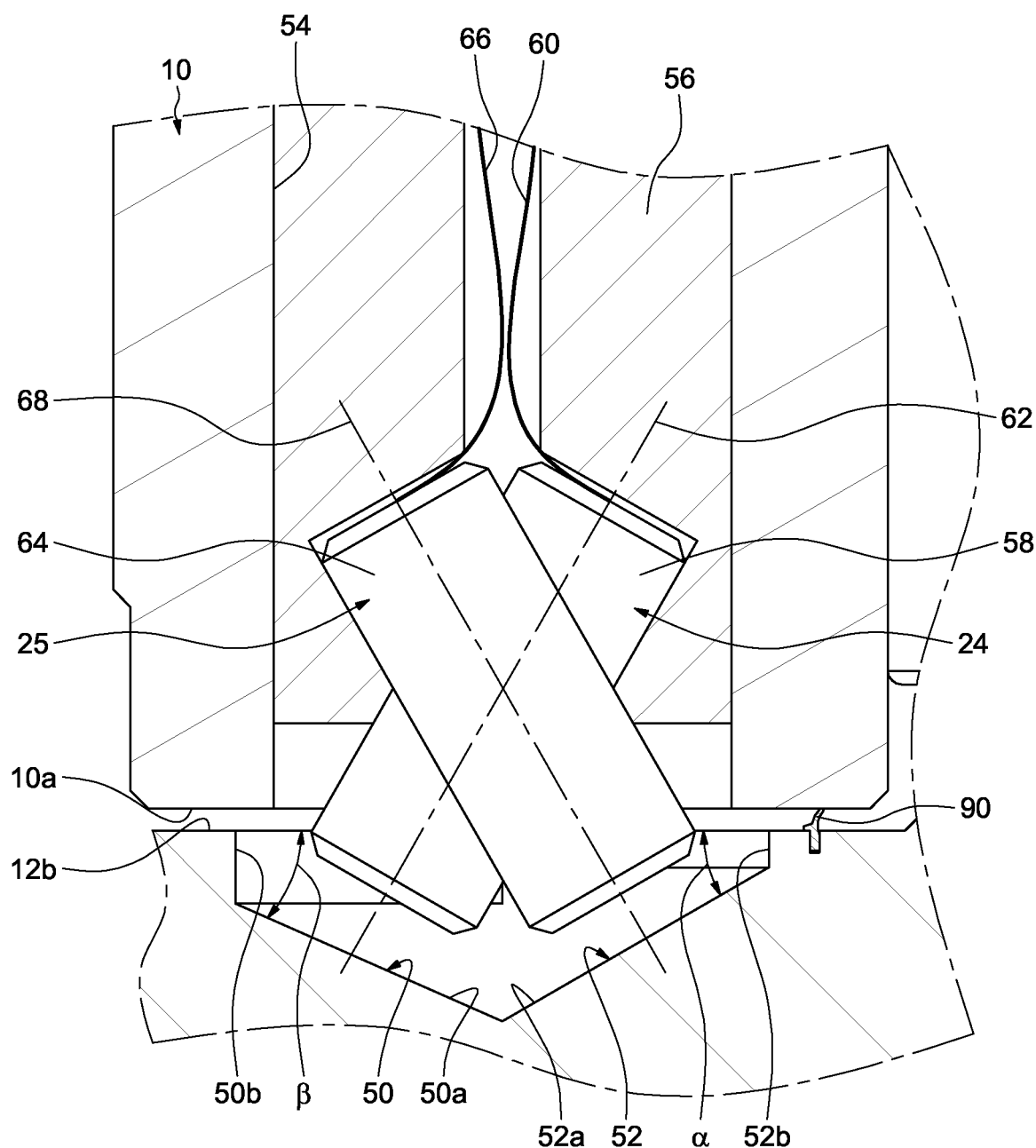
FIG. 6 is a detail view of a rolling bearing according to a second example of the invention.

The example shown on FIG. 6, in which identical parts are given identical references, only differs from the first example in that the value of the first taper angle β, which is formed between the tapered wall 50a of the first groove and the axial cylindrical surface 12b, is different from the value of the second taper angle α formed between the tapered wall 52a of the second groove and the axial cylindrical surface 12b.

Accordingly, in this case, the axial relative displacement. Da and the radial relative displacement Dr of the inner ring 12 relative to the outer ring 10 are equal to:

$$Da = \frac{(\Delta S_{24} - b \cdot \Delta S_{25})}{(\sin\beta + b \cdot \sin\alpha)} \quad (8)$$

$$Dr = \frac{(\Delta S_{24} + a \cdot \Delta S_{25})}{(\cos\beta + a \cdot \cos\alpha)} \quad (9)$$

where $$a = \frac{\sin\beta}{\sin\alpha} \quad (10)$$

and $$b = \frac{\cos\beta}{\cos\alpha} \quad (11)$$

In the illustrated examples, the tapered grooves 50, 52 are formed on the outer cylindrical surface 12b of the inner ring axially between the row of axial rollers 20 and the seal 42. Alternatively, according to the design of the rolling bearing, it could be possible to provide the grooves 50, 52 on another zone of the outer cylindrical surface 12b, or on the outer cylindrical surface of the nose of the inner ring.

In the illustrated examples, the tapered grooves 50, 52 are connected together. In other words, the second groove 52 extends axially the first groove 50. In another variant, the tapered grooves 50, 52 may be axially spaced one relative to another. The tapered grooves 50, 52 may be provided on the same outer cylindrical surface of the inner ring, or on two distinct axial cylindrical surfaces of the inner ring, for example the outer cylindrical surface 12b and the outer cylindrical surface of the nose of the inner ring.

Otherwise, as previously mentioned, in this illustrated example, the first ring of the rolling bearing is the outer ring 10 whereas the second ring is the inner ring 12.

As an alternative, it could be possible to provide a reversed arrangement with the first ring forming the inner ring and the second ring forming the outer ring. In this case, each of the tapered groove 50, 52 is formed on the axial inner cylindrical surface of the outer ring, which forms the bore of the outer ring, and the sensors 24, 25 are mounted on the inner ring.

In another embodiment (not represented), one single tapered groove is formed on the outer cylindrical surface 12b of the second ring and oriented towards the first ring 10.

The first distance sensor 24 is mounted on the first ring 10 and facing a tapered wall of the tapered groove of the second ring 12 which is inclined with respect to the axis X-X'.

The longitudinal axis 62 of the first distance sensor 24 is perpendicular to the axis X-X'.

The second distance sensor 25 is mounted on the first ring 10 and distinct from the first distance sensor 24.

The second distance sensor 25 radially faces a second axial cylindrical surface of the second ring 12.

The axial relative displacement Da and the radial relative displacement Dr of the inner ring 12 relative to the outer ring 10 are equal to $$Da = \frac{(\Delta M + Dr)}{(\sin\gamma)} \quad (12)$$

where ΔM is the value of the differential measurement of the first distance sensor 24 on the tapered wall of the second ring 12, and the radial relative displacement Dr is the value of the differential measurement of the second distance sensor 25 on the outer cylindrical surface 12b of the second ring 12, and γ is the value of the angle formed between the tapered wall of the tapered groove and the outer cylindrical surface 12b of the second ring 12 in a radial plane of the bearing 8.

Figure 7:
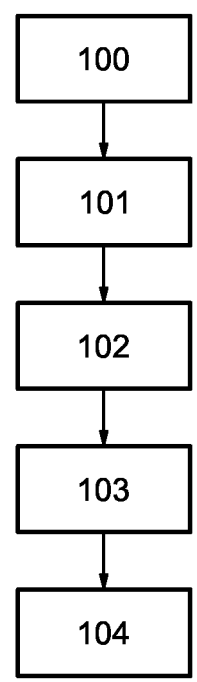
FIG. 7 illustrates an example of a method for determining at least one defect of a bearing according to the invention.

FIG. 7 illustrates an example of a method implementing the system 1.

In step 100, the first distance sensor 24 and second distance sensor 25 measure the first and second differential distances between the first ring 10 and the second ring 12 when the first ring 10 is rotating relative to the second ring 12 at different relative angular positions of the first and second rings 10, 12 during a predefined duration.

The differential measurements $\Delta S_{24}$ of the sensor 24 representative of a first differential distance and the differential measurements $\Delta S_{25}$ of the sensor 25 representative of a second differential distance are stored by the storing means RM according to the relative angular position of the first and second rings 10, 12 and a value of the temporal variable during the predefined duration in step 101, for example in the form of a table.

During step 102, the determining means DM determine a first temporal profile of the radial relative displacement Dr and a second temporal profile of the axial relative displacement Da according to the stored differential measurement $\Delta S_{24}$ and the differential measurements $\Delta S_{25}$ by the storing means RM.

The determining means DM determine the radial relative displacement Dr and the axial relative displacement Da from equations (6) and (7), (8) and (9) or (12).

Then, the determining means DM determine the first temporal profile representing the radial relative displacement Dr according to the evolution of the temporal variable and to the relative angular position of the first and second rings 10, 12.

The determining means DM further determine the second temporal profile representing the axial relative displacement Da according to the evolution of the temporal variable and to the relative angular position of the first and second rings 10, 12.

The determining means DM may further determine a reference displacement Dref between the first ring 10 and second ring 12 from the radial relative displacement. Da and the axial relative displacement Dr.

The reference displacement Dref is equal to:

$$Dref = \sqrt{Da^2 + Dr^2} \quad (13)$$

The determining means DM may determine a third temporal profile of the reference displacement Dref according to the evolution of the temporal variable and to the relative angular position of the first and second rings.

The identifying means IM may also identify a defect of the bearing 8 from the third temporal profile.

During a step 103, the determining means DM may further determine the relative rotational speed between the first and the second rings 10, 12 according to at least one temporal profile.

As each temporal profile, gives the evolution of a relative displacement according to the temporal variable and relative angular position of the first and second rings, the determining means DM determine the duration so that the first ring 10 accomplish a complete turn relative to the second ring 12 and then compute the relative rotational speed.

In step 104, the identifying means IM identify a defect of the bearing 8 from the temporal profiles.

The identifying means IM convert at least one of the first, second or third temporal profiles to a representative in the frequency domain, for example using the Fast Fourier Transform algorithm (FFT).

The identifying means 1M compare the frequencies of the representative to predefined frequencies characterising defects of the bearing.

The predefined frequencies may be stored in the identifying means IM and are for example determined empirically.

Each predefined frequency is characteristic of one defect of the bearing 8.

If during the comparison, one frequency of the representative matches with one predefined frequency, the identifying means IM conclude that the bearing 8 is defect and has the defect linked up with the defect characterized by the predefined frequency.

As a variant, the identifying means IM calculate the second derivative of at least one temporal profile to obtain the relative vibrations between the first and the second rings 10, 12.

The relative vibrations determined by the identifying means IM are transmit to standard vibration analysing means to perform a standard vibration analysis from the relative vibrations and identifying a bearing defect from the vibration analysis.

In this variant, standard components used to determine defects of the bearing 8 from accelerometers are used.

The system 1 permits to limit the number of sensor and sensor processing devices and also to reduce machining on the bearing to install the sensors to monitor the bearing 8 in order to detect one defect and to monitor the vibrations.

The system 1 permits to monitor separately with the same sensor set, the axial and radial vibrations.

The system 1 needs no extensive calibrations to filter the vibrations characteristic of a defect of the bearing 8 and is particularly adapted for low frequency and low rotational speed of bearing.

Further, the vibrations measurements determined from relative displacements are not affected by the environment of the bearing 8.

In the described examples, the bearing 8 is a stewing bearing provided with three rows of rolling elements. Alternatively, the rolling bearing may comprise only one row of rolling elements, or two rows of rolling elements, or four or more rows of rolling elements. In the illustrated example, the rolling elements are rollers. The rolling bearing may comprise other types of rolling elements, for example balls. In another variant, the bearing may also be a sliding bearing having no rolling elements.

The invention claimed is:

1. A method for determining at least one defect of a bearing without using an accelerometer, the method comprising:
   providing a first ring and a second ring capable of rotating concentrically relative to one another,
   measuring first and second differential distances between the first ring and the second ring without using any accelerometers when the first ring is rotating relative to the second ring at different relative angular positions of the first and second rings during a predefined duration,
   storing each measured differential distance according to the relative angular position of the first and second rings and a value of a temporal variable indicative of the evolution of the predefined duration,
   determining a first temporal profile of a radial relative displacement between the first and second rings, and a second temporal profile of an axial relative displacement between the first and second rings according to the stored measured differential distances, and
   identifying a defect of the bearing from the temporal profiles such that the defect is detected without the use of any accelerometers.

2. The method according to claim 1, comprising determining a third temporal profile of a reference displacement between the first ring and second ring from the radial relative displacement and the axial relative displacement, the temporal variable and the relative angular position of the first and second rings.

3. The method according to claim 1, further comprising determining the relative rotational speed between the first and the second rings according to at least one of the temporal profiles.

4. The method according to claim 1, in which identifying a defect comprises:
   converting at least one of the temporal profiles to a representative in the frequency domain,
   comparing the frequencies of the representative to predefined frequencies characterising defects of the bearing, and
   identifying a defect of the bearing according to the result of the comparison.

5. The method according to claim 1, wherein identifying a defect comprises:
   calculating the second derivative of at least one of the temporal profiles to obtain the relative vibrations between the first and the second rings,
   performing a vibration analysis from the relative vibrations, and
   identifying a bearing defect from the vibration analysis.

6. A system for determining at least one defect of a bearing without using an accelerometer, the system comprising:
   a first ring and a second ring capable of rotating concentrically relative to one another,
   at least a sensor for measuring first and second differential distances between the first ring and the second ring without using any accelerometers when the first ring is rotating relative to the second ring and for measuring the relative angular position of the first and second rings, during a predefined duration, storing means for storing each measured differential distance according to the relative angular position of the first and second rings and a value of a temporal variable indicative of the evolution of the predefined duration, determining means for determining a temporal profile of a radial relative displacement between the first and second rings, and a second temporal profile of an axial relative displacement between the first and second rings according to the stored measured differential distances by the storing means, and identifying means for identifying a defect of the bearing from the temporal profile such that the defect is detected without the use of any accelerometers by the system.

7. The system according to claim 6, in which the measuring means comprise first and second distance sensors mounted on the first ring of the bearing.

8. The system according to claim 6, wherein the determining means is configured to determine a third temporal profile of a reference displacement between the first ring and second ring from the radial relative displacement and the axial relative displacement, the temporal variable and the relative angular position of the first and second rings.

9. The system according to claim 6, wherein the determining means is configured to determine the relative rotational speed between the first and the second rings according to at least one of the temporal profiles.

10. The system according to claim 6, wherein the identifying means is configured to: (1) convert at least one of the temporal profiles to a representative in the frequency domain; (2) compare the frequencies of the representative to predefined frequencies characterising defects of the bearing; and (3) identify a defect of the bearing according to the result of the comparison.

11. The system according to claim 6, wherein the identifying means is configured to: (1) calculate the second derivative of at least one of the temporal profiles to obtain the relative vibrations between the first and the second rings; (2) perform a vibration analysis from the relative vibrations; and (3) identify a bearing defect from the vibration analysis.

12. A system for determining at least one defect of a bearing, the system comprising:

a first ring and a second ring capable of rotating concentrically relative to one another, first and second distance sensors are mounted on the first ring of the bearing, the first and second distance sensors being configured to measure first and second differential distances between the first ring and the second ring when the first ring is rotating relative to the second ring and for measuring the relative angular position of the first and second rings, during a predefined duration, a processing unit configured to store each measured differential distance according to the relative angular position of the first and second rings and a value of a temporal variable indicative of the evolution of the predefined duration, the processing unit being configured to determine a temporal profile of a radial relative displacement between the first and second rings, and a second temporal profile of an axial relative displacement between the first and second rings according to the stored measured differential distances by the processing unit, and the processing unit being configured to identify a defect of the bearing from the temporal profile, wherein at least a first tapered groove and at least a second tapered groove are formed on the second ring of the bearing and are oriented towards the first ring, the first distance sensor being mounted on the first ring and facing a tapered wall of the first tapered groove of the second ring which is inclined with respect to an axis of the bearing, a longitudinal axis of the first distance sensor being perpendicular to the tapered wall of the first tapered groove, and the second distance sensor being mounted on the first ring and facing a tapered wall of the second tapered groove of the second ring which is inclined with respect to the axis of the bearing, a longitudinal axis of the second distance sensor being perpendicular to the tapered wall of the second tapered groove, the tapered walls of the first and second grooves extending obliquely along two opposite directions.

13. A system for determining at least one defect of a bearing, the system comprising:

a first ring and a second ring capable of rotating concentrically relative to one another, first and second distance sensors are mounted on the first ring of the bearing, the first and second distance sensors being configured to measure first and second differential distances between the first ring and the second ring when the first ring is rotating relative to the second ring and for measuring the relative angular position of the first and second rings, during a predefined duration, storing means for storing each measured differential distance according to the relative angular position of the first and second rings and a value of a temporal variable indicative of the evolution of the predefined duration, determining means for determining a temporal profile of a radial relative displacement between the first and second rings, and a second temporal profile of an axial relative displacement between the first and second rings according to the stored measured differential distances by the storing means, and identifying means for identifying a defect of the bearing from the temporal profile, wherein at least one tapered groove is formed on the outer cylindrical surface of the second ring and oriented towards the first ring, the first distance sensor being mounted on the first ring and facing a tapered wall of the tapered groove of the second ring which is inclined with respect to an axis of the bearing, a longitudinal axis of the first distance sensor being perpendicular to the axis, and the second distance sensor being mounted on the first ring and distinct from the first distance sensor, the second distance sensor radially facing a second axial cylindrical surface of the second ring.

14. The system according to claim 13, wherein the identifying means is configured to determine a third temporal profile of a reference displacement between the first ring and second ring from the radial relative displacement and the axial relative displacement, the temporal variable and the relative angular position of the first and second rings.

15. The system according to claim 13, wherein the determining means is configured determine the relative rotational speed between the first and the second rings according to at least one of the temporal profiles.

16. The system according to claim 13, wherein the identifying means is configured to: (1) convert at least one of the temporal profiles to a representative in the frequency domain; (2) compare the frequencies of the representative to predefined frequencies characterising defects of the bearing; and (3) identify a defect of the bearing according to the result of the comparison.

17. The system according to claim 13, wherein the identifying means is configured to: (1) calculate the second derivative of at least one of the temporal profiles to obtain the relative vibrations between the first and the second rings; (2) performing a vibration analysis from the relative vibrations; and (3) identifying a bearing defect from the vibration analysis.

18. A bearing comprising:
a first ring defining a first through-hole therein,
a second ring capable of rotating concentrically relative to one another, and
a system for determining at least one defect of a bearing providing a first ring and a second ring capable of rotating concentrically relative to one another, a distance sensor for measuring first and second differential distances between the first ring and the second ring when the first ring is rotating relative to the second ring and for measuring the relative angular position of the first and second rings, during a predefined duration, the distance sensor is located in the through-hole of the first ring and faces the second ring, storing means for storing each measured differential distance according to the relative angular position of the first and second rings and a value of a temporal variable indicative of the evolution of the predefined duration, determining means for determining a temporal profile of a radial relative displacement between the first and second rings, and a second temporal profile of an axial relative displacement between the first and second rings according to the stored measured differential distances by the storing means, and identifying means for identifying a defect of the bearing from the temporal profile.

19. The bearing according to claim 18, wherein the determining means is configured to determine a third temporal profile of a reference displacement between the first ring and second ring from the radial relative displacement and the axial relative displacement, the temporal variable and the relative angular position of the first and second rings.

20. The bearing according to claim 18, wherein the determining means is configured to determine the relative rotational speed between the first and the second rings according to at least one of the temporal profiles.

* * * * *